United States Patent
Thompson et al.

(10) Patent No.: US 10,698,083 B2
(45) Date of Patent: Jun. 30, 2020

(54) METHOD AND APPARATUS OF DIGITAL BEAMFORMING FOR A RADAR SYSTEM

(71) Applicant: Raytheon Company, Waltham, MA (US)

(72) Inventors: Daniel Thompson, Waltham, MA (US); Harry B. Marr, Waltham, MA (US); Ian Robinson, Waltham, MA (US); Jeffrey Caldwell, Waltham, MA (US)

(73) Assignee: Raytheon Company, Waltham, MA (US)

( * ) Notice: Subject to any disclaimer, the term of this patent is extended or adjusted under 35 U.S.C. 154(b) by 316 days.

(21) Appl. No.: 15/686,630

(22) Filed: Aug. 25, 2017

(65) Prior Publication Data

US 2019/0067814 A1    Feb. 28, 2019

(51) Int. Cl.
  *G01S 7/03* (2006.01)
  *H01Q 3/26* (2006.01)
  *G01S 7/40* (2006.01)
  *G01S 13/02* (2006.01)

(52) U.S. Cl.
  CPC ............ *G01S 7/032* (2013.01); *G01S 7/4026* (2013.01); *G01S 13/0209* (2013.01); *H01Q 3/2605* (2013.01); *G01S 2013/0254* (2013.01); *H01Q 3/2682* (2013.01)

(58) Field of Classification Search
  CPC .................. G01S 7/032; G01S 13/0209; G01S 2013/0254; G01S 7/4026; H01Q 3/2605; H01Q 3/2682
  See application file for complete search history.

(56) References Cited

U.S. PATENT DOCUMENTS

| | | | |
|---|---|---|---|
| 5,315,303 A * | 5/1994 | Tsou | G01S 7/032 342/200 |
| 6,380,908 B1 | 4/2002 | Andrews et al. | |
| 9,385,746 B1 * | 7/2016 | Ng | H04L 25/4902 |
| 9,628,164 B1 | 4/2017 | Thompson et al. | |
| 2013/0169471 A1 | 7/2013 | Lynch | |
| 2015/0285907 A1 * | 10/2015 | Mohamadi | H01Q 3/24 342/21 |

(Continued)

FOREIGN PATENT DOCUMENTS

EP    0617796 B1    10/1994

OTHER PUBLICATIONS

Fulton, et al., "A Digital Array Radar with a Hierarchical System Architecture," IEEE, Microwave Symposium Digest, 2009.

(Continued)

*Primary Examiner* — Matthew M Barker
(74) *Attorney, Agent, or Firm* — Burns & Levinson, LLP; Joseph M. Maraia

(57) ABSTRACT

A system and method of digital beamforming for a monobit phased array radar system includes providing a plurality of monobit analog signals received by at least one antenna to at least one field programmable gate array (FPGA). A plurality of monobit SerDes transceivers within the FPGA convert the plurality of monobit analog signals into a plurality of multibit digital signals, each of the multibit digital signals being modified according to a digital signal conditioning value to calibrate, phase align, and synchronize the digital signals. A digital beam is formed by coherently combining the plurality of digital signals within the FPGA.

11 Claims, 2 Drawing Sheets

(56) References Cited

U.S. PATENT DOCUMENTS

2017/0262398 A1\* 9/2017 Lugo .................. G06F 13/4221
2017/0293018 A1\* 10/2017 Turbiner .................. G01S 7/32
2018/0059215 A1\* 3/2018 Turbiner .............. G01S 15/931

OTHER PUBLICATIONS

Kozak, et al., "Digital Phased Array Beamforming Using Single-Bit Delta-Sigma Conversion with Non-Uniform Oversampling," IEEE Transactions on Ultrasonics, Ferroelectrics, and Frequency Control, vol. 48, No. 4, 2001.
Emami, et al., "A 60GHz CMOS Phased-Array Transceiver Pair for Multi-Gb/s Wireless Communications," IEEE International Solid-State Circuits Conference, 2011.
International Search Report and Written Opinion from related PCT Application No. PCT/US2018/030264 dated Jan. 30, 2019.

\* cited by examiner

METHOD AND APPARATUS OF DIGITAL BEAMFORMING FOR A RADAR SYSTEM

FIELD OF THE INVENTION

The subject disclosure relates to radar systems and more particularly to systems and methods of digital beamforming for radar systems.

BACKGROUND OF THE INVENTION

Current digital phase array systems can cost upwards of $10,000 per channel. Design choice decisions often include balancing trade-offs between size, weight and power (SWaP) and performance, among other things. Field programmable gate array (FPGA) devices are used to provide advantages for digital-based functions. Further, available designs often include Analog-to-Digital Converters (ADC) that are separate from the FPGA, as FPGAs have limited functions when it comes to analog capabilities. This results in numerous external multiple bit ADCs connecting with the FPGA. These systems also tend to require numerous analog components such as filters, mixers, amplifiers, and the like, thereby increasing SWaP concerns.

Additionally, certain phase array systems, such as phased array radar (PAR), many RX/TX elements are employed to form beams. These systems are typically made up of heterogeneous submodules. The integration of all these components together in a small form factor for a low cost is a challenge. Fully digital PAR programs can cost many millions of dollars and optimal SWaP modules capable of wide bandwidths (e.g. ESM modes) are not available.

SUMMARY OF THE INVENTION

In light of the needs described above, in at least one aspect, subject technology relates to a digital phased array system and/or method of digital beamforming that is affordable, efficient, and accurate. Further, the subject technology provides a fully digital, wideband system and method driven directly within a digital signal processing chip such as a FPGA which requires limited outside components.

In at least one embodiment, the subject technology relates to a method of digital beamforming for a monobit phased array radar system. A plurality of monobit analog signals received by at least one antenna are provided to at least one digital signal processing chip interfacing the at least one antenna. In some cases, the at least one digital signal processing chip directly interfaces with the at least one antenna. A digital signal conditioning value for each of the monobit analog signals is determined by a processing module. The processing module can be part of one of the digital signal processing chips, or an external component. Further, each digital signal conditioning value can be created, at least in part, by determining a monobit time delay to compensate for response errors attributable to analog input pins of the SerDes transceivers to contribute to formation of a desired beam. A plurality of monobit SerDes transceivers within the at least one digital signal processing chip convert the plurality of monobit analog signals into a plurality of multibit digital signals. In some cases, analog input SerDes transceiver pins can be used as virtual analog-to-digital or digital-to-analog converters. Each of the multibit digital signals is modified according to the digital signal conditioning value of the respective monobit analog signal to phase align and synchronize the digital signals. A digital beam is then formed by coherently combining the plurality of digital signals within the digital signal processing chip. Further, digital signals can be combined from multiple and/or separate digital processing chips to form a digital beam. The method can also include a receiving mode where phase aligned multibit digital signals are combined to achieve signal processing gain. The method can also include a transmitting mode where the power of multibit digital signals are combined to achieve coherent gain. In some cases, each of the at least one digital signal processing chips are field programmable gate arrays (FPGAs). Further, in some embodiments, the SerDes transceivers are used in a loop back configuration to create a Sigma Delta receiver.

In some embodiments, the subject technology relates to an ultra-wideband digital phased array radar system. The system includes an antenna array with a plurality of antenna elements configured to receive a plurality of monobit analog signals. At least one digital signal processing chip (such as an FPGA) interfaces with the antenna array. In some cases, the digital processing chip interfaces directly with antenna elements within the antenna array. Each digital signal processing chip includes an integrated all digital chip including a plurality of monobit SerDes transceivers and a digital beamforming unit. The digital signal processing chip is configured to determine, for each monobit analog signal, a respective digital signal conditioning value. Through use of the plurality of monobit SerDes transceivers, the digital signal processing chip converts the plurality of monobit analog signals into a plurality of digital signals, each of the digital signals being modified according to its respective digital signal conditioning value to phase align and synchronize the digital signals. The digital signal conditioning value can be determined using delta sigma modulation, DC offset modulation, and coherently summing many elements for dynamic range. Finally, the digital signal processing chip forms a digital beam by coherently combining, within the digital beamforming unit, the plurality of digital signals. In some embodiments, a daughter card provides an array of RF ports which directly interface the monobit SerDes transceivers and antenna array. The system can also include an application specific transmit/receive module interfacing the monobit SerDes transceivers and the antenna array.

In some embodiments, the subject technology relates to a method of digital beamforming for a monobit phased array radar system. A plurality of monobit analog signals received by at least one antenna are provided to at least one FPGA interfacing the at least one antenna. A plurality of monobit SerDes transceivers within the at least one FPGA convert the plurality of monobit analog signals into a plurality of multibit digital signals, each of the multibit digital signals being modified according to a digital signal conditioning value to calibrate, phase align, and synchronize the digital signals. A digital beam is then formed by coherently combining the plurality of digital signals within the digital signal processing chip.

BRIEF DESCRIPTION OF THE DRAWINGS

So that those having ordinary skill in the art to which the disclosed system pertains will more readily understand how to make and use the same, reference may be had to the following drawings.

Various aspects of the disclosure are discussed below with reference to the accompanying figures. It will be appreciated that for simplicity and clarity of illustration, elements shown in the drawings have not necessarily been drawn accurately or to scale. For example, the dimensions of some of the elements may be exaggerated relative to other elements for clarity or several physical components may be included in one functional block or element. Further, where considered appropriate, reference numerals may be repeated among the drawings to indicate corresponding or analogous elements. For purposes of clarity, not every component may be labeled in every drawing. The figures are provided for the purposes of illustration and explanation and are not intended as a definition of the limits of the disclosure.

DETAILED DESCRIPTION

Figure 1:
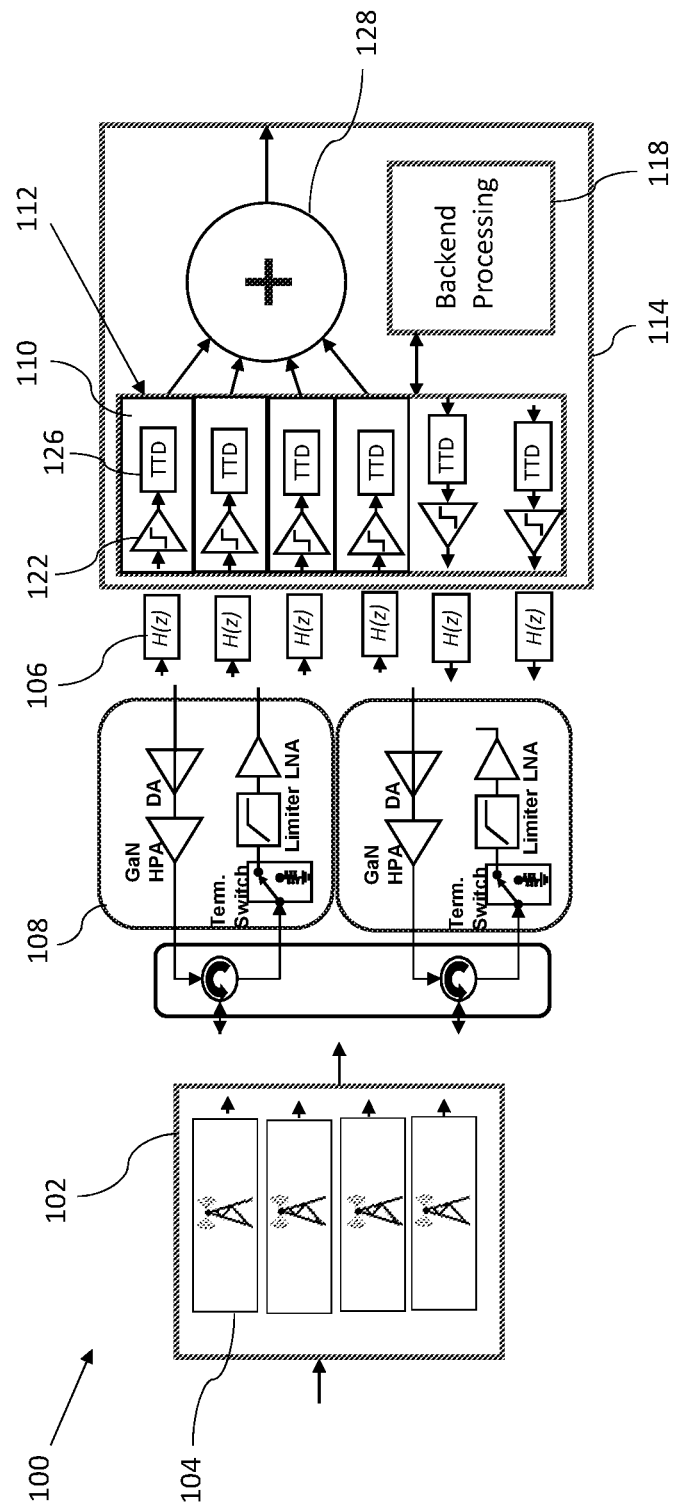
FIG. 1 is a schematic block diagram of a phased array radar system in accordance with the subject technology.

The subject technology overcomes many of the prior art problems associated with digital beamforming. The advantages, and other features of the systems and methods disclosed herein, will become more readily apparent to those having ordinary skill in the art from the following detailed description of certain preferred embodiments taken in conjunction with the drawings which set forth representative embodiments of the present invention. Like reference numerals are used herein to denote like parts. Further, words denoting orientation such as "upper", "lower", "distal", and "proximate" are merely used to help describe the location of components with respect to one another. For example, an "upper" surface of a part is merely meant to describe a surface that is separate from the "lower" surface of that same part. No words denoting orientation are used to describe an absolute orientation (i.e. where an "upper" part must always be at a higher elevation).

It is to be understood that the disclosure is not limited in its application to the details of construction and the arrangement of the components set forth in the following description or illustrated in the drawings as it is capable of implementations or of being practiced or carried out in various ways. Also, it is to be understood that the phraseology and terminology employed herein are for the purpose of description only and should not be regarded as limiting.

Certain features, which are, for clarity, described in the context of separate implementations, may also be provided in combination in a single implementation. Conversely, various features, which are, for brevity, described in the context of a single implementation, may also be provided separately or in any suitable sub-combination. Well-known methods, procedures, components and structures may not have been described in detail so as not to obscure the aspects of the disclosure.

Referring now to FIG. 1, a block diagram of a digital phased array radar system in accordance with subject technology is shown generally at 100. The system 100 contains an antenna array 102 with multiple antenna elements 104, each antenna element 104 being configured to receive monobit analog signals. The antenna array 102 provides the analog signals to circuitry 108 (e.g. amplifiers) further processing. The circuitry 108 acts as a transceiver module which filters, mixes, and amplifies the analog signals to ensure that downstream components (e.g. quantizers) are biased appropriately to achieve good linearity and signal-to-noise ratio. After processing within the circuitry 108, the signals are provided to Serializer/Deserializer (SerDes) transceivers within an array 112 which act as quantizers on a field programmable gate array (FPGA) 114.

Notably, in some embodiments, no circuitry 108 is provided between the antenna array 102 and the FPGA 114. Instead, the antenna array 102 interfaces directly with the FPGA 114, providing the FPGA 114 with the unprocessed analog signals received by the antenna array 102. Further, while an FPGA 114 is used in one embodiment and as an illustrative example in FIG. 1, other integrated all digital chips or digital signal processing chips as are known in the art can be used in addition, or as an alternative to, the FPGA 114. For example an electrical circuit, such as an ASIC or microchip, may be used as an integrated all digital chip. Similarly, while the system 100 above is shown as having a single FPGA 114 for the sake of simplicity, multiple FPGAs and/or digital signal processing chips can also be used. Several FPGAs can each interface with multiple antenna elements 104 or each antenna element 104 can interface with a designated FPGA 114.

Each of the monobit analog signals pass through a designated channel 110 within the SerDes transceiver array 112. The antenna elements 104 can each communicate with a designated channel 110 passing through a single SerDes transceiver within the SerDes transceiver array 112. However, there need not be a 1:1 correlation between antenna elements 104 and individual SerDes transceiver channels 110 within the SerDes transceiver array 112. In general, the SerDes transceiver channels 110 effectively act as analog-to-digital converters directly on the FPGA 114, receiving the initial monobit analog signals from the antenna elements 104 and converting and combining the analog signals into digital signals for beamforming. For example, the SerDes transceivers can have a number of analog input pins. The analog input pins of the monobit SerDes transceivers can be utilized as virtual analog-to-digital or digital-to-analog converters within a digital signal processing chip or the FPGA 114.

The SerDes transceiver channels 110 also work to calibrate (phase align) and synchronize the signals based on digital signal conditioning values. The digital signal conditioning values are derived by one of the various adaptive digital filtering techniques, as are known in the art. For example, digital signal conditioning values can be determined using DC offset modulation or by coherently summing many elements for dynamic range. Additionally, or alternatively, digital signal conditioning values can be determined using delta sigma modulation by using the SerDes transceiver array 112 in a loop back configuration to create a Sigma Delta receiver. Synchronization and calibration can be accomplished with the help of a processing module 118 which interfaces with the FPGA 114. In the example given, the processing module 118 is integrated directly onto the FPGA 114, and therefore, the processing is done on the FPGA 114. However, the processing module 118 can also be an external component communicating with the FPGA 114.

Other external components can also interface with the various components of the system 100. For example, a daughter card expansion circuit (not shown) can provide an array of RF ports directly interfacing the monobit SerDes transceivers and/or the antenna array 102. Further, the daughter and an application specific transmit/receive module can interface the monobit SerDes transceivers and the antenna array 102.

The SerDes transceiver channels 110 use a model of the analog front end components between the antenna elements 104 and the SerDes transceiver array 112, represented here as H(z) block 106. The model created within each H(z) block 106 is relied on by the SerDes transceiver array 112 to make channel specific adjustments to account for errors related to the response of that channel 110. The model of the H(z) block 106 can be relied upon when the signals are filtered using true time delay (TTD) through TTD block 126 to modify the signals within a channel 110 to account for circuit imperfections and op-amp non-idealities which affect that channel 110. While the H(z) block 106 is outside of the FPGA 114 in the example given, the H(z) block may also be part of a decision feedback equalizer (DFE) residing within the corresponding SerDes transceiver within the SerDes transceiver array 112.

Upon entering a channel 110 of the SerDes transceiver array 112, the signals are then provided to comparators 122 which each act as single bit analog-digital converters. The comparators 122 convert the monobit signals by registering a one for a positive analog voltage and zero for a negative voltage value, assuming a differential signal. Signals leaving the comparators 122 are then sent to a true time delay (TTD) block 126. The TTD blocks 126 serve as digital interpolating filters, and unique TTD quantities for each signal are generated by various techniques as are known in the art to condition the digital signals, such as those described herein. Signals within a particular channel 110 can be adjusted depending on the position of a corresponding antenna element 104 within the antenna array 102 associated with that channel 110 to compensate for timing synchronization between channels 110. For example, a number of finite impulse response (FIR) filters can be used to align the signals incoming from the various antenna elements 104 using known delay values associated with those antenna elements 104. Each TTD block 126 can also be used to account for known errors derived within the corresponding H(z) block 106 to develop a digital signal conditioning value and apply the value to the signal within the respective channel 110.

Any synchronization and calibration (or phase alignment) technique, as are known in the art, can be applied to the signals within the SerDes transceiver array 112, either within the H(z) blocks 106 (if included as part of an analog component of a SerDes), comparators 122, TTD blocks 126, or within other blocks included within, or in direct communication with, the SerDes transceiver array 112. For example, a monobit time delay can be determined and included as part of the digital signal conditioning values to compensate for response errors attributable to analog input pins of the SerDes within the SerDes transceiver array 112 to contribute to the formation of a desired beam. Additionally, sampling with monobit SerDes is known to introduce slight effects which can be compensated for during calibration. Loop-back techniques and mutual coupling calibration, are also known calibration methods which can be applied to signals within the SerDes transceiver array 112. An equalizing filter can be used to synchronize in the frequency domain, and also non-linear filters can be used to implement post distortion algorithms. Once a TTD delay has been applied, as well as any other desired synchronization and/or calibration techniques, the multiple monobit signals the signals are passed from the SerDes transceiver array 112 as a synchronized signal.

After passing through the TTD blocks 126, the digital signals are then provided to a digital beamforming unit 128 where the signals from multiple TTD blocks 126 are coherently combined into a digital beam. The digital beam is a digital sum of the numerous SerDes transceiver channels 110 within the SerDes transceiver array 112. Once the signals reach the digital beamforming unit 128, the process of coherently combining the signals can be accomplished in a variety of ways as are known in the art. For example, the outputs from the various channels 110 can be multiplied by beamforming weights and computing sums to amplify signals arriving from some directions while signals arriving from other directions are attenuated. While in the example shown all digital beams entering the digital beamforming unit 128 come from the FPGA 114, in other embodiments at least some of the plurality of digital signals come from a separate digital signal processing chip. For example, digital signals from multiple digital signal processing chips and/or FPGAs can be sent to a digital beamforming unit 128 for coherent combining.

The system 100 can be operated in a receiving mode, a transmitting mode, or a combination of both. During the transmitting mode, the system 100 sends signals out. The power of the multibit digital signals can be combined during the transmitting mode to achieve a coherent gain. In receiving mode the system 100 detects signals coming in. Phase aligned multibit digital signals can be combined, in the receiving mode, to achieve signal processing gain. Transmission and receiving can also be conducted simultaneously.

Figure 2:
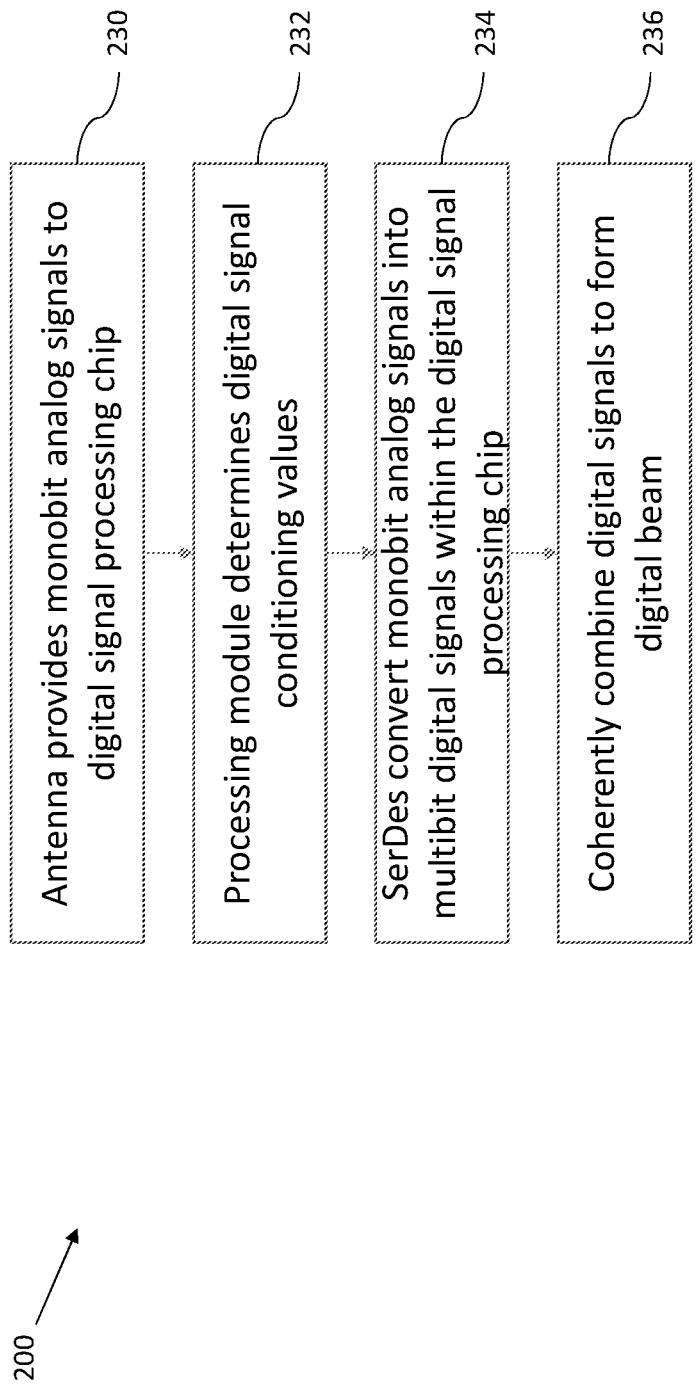
FIG. 2 is a flowchart showing a method of digital beamforming for a phased array radar system in accordance with the subject technology.

Referring now to FIG. 2, a flowchart showing a method of digital beamforming in accordance with the subject technology is shown generally at 200. The method 200 can be implemented using the system 100 as described above. At step 230, the method 200 begins when antenna elements 104 within an antenna array 102 provide monobit analog signals to a digital signal processing chip, such as an FPGA 114. A processing module 118 interfaces with the digital signal processing chip, and in some cases, is part of the digital signal processing chip. At step 232, the processing module 118 determines a digital signal conditioning value for each signal provided to the digital processing chip. As discussed above, the digital signal conditioning value works to phase align and synchronize the signals, for example, by removing noise and modifying each signal depending on the position of the corresponding antenna element 104.

At step 234, monobit SerDes transceivers 112 convert the monobit analog signals into multibit signals within the digital signal processing chip. Step 234 can be performed by a quantizer, such as by comparators 122 within the SerDes transceiver arrays 112. The digital signal conditioning values are applied to each signal, respectively, during this conversion process. Finally, at step 236, the digital signals are coherently combined, for example in a digital beamforming unit 128, to form a digital beam representing a digital sum of the signals within the transceiver channels 110.

It will be appreciated by those of ordinary skill in the pertinent art that the functions of several elements may, in alternative embodiments, be carried out by fewer elements or a single element. Similarly, in some embodiments, any functional element may perform fewer, or different, operations than those described with respect to the illustrated embodiment. Also, functional elements (e.g., electronics, processors, transmitters, and the like) shown as distinct for purposes of illustration may be incorporated within other functional elements in a particular implementation.

While the subject technology has been described with respect to preferred embodiments, those skilled in the art will readily appreciate that various changes and/or modifications can be made to the subject technology without departing from the spirit or scope of the subject technology. For example, each claim may depend from any or all claims in a multiple dependent manner even though such has not been originally claimed.

What is claimed is:
1. A method of digital beamforming for a monobit phased array radar system, comprising:

providing a plurality of monobit analog signals received by at least one antenna to at least one digital signal processing chip interfacing the at least one antenna, wherein the at least one digital signal processing chip is a field programmable gate array (FPGA);

determining, by at least one processing module, a digital signal conditioning value for each of the monobit analog signals by using delta sigma modulation, DC offset modulation, and coherently summing a plurality of elements for dynamic range;

converting, by a plurality of monobit SerDes transceivers within the at least one digital signal processing chip, the plurality of monobit analog signals into a plurality of multibit digital signals, each of the multibit digital signals being modified according to the digital signal conditioning value of the respective monobit analog signal to phase align and synchronize the digital signals; and forming a digital beam by coherently combining the plurality of digital signals within the digital signal processing chip.

2. The method of claim 1, wherein in the step of providing the analog signals, the at least one digital signal processing chip directly interfaces with the at least one antenna.

3. The method of claim 1, wherein the at least one processing module is part of the digital signal processing chip.

4. The method of claim 1, wherein each digital signal conditioning value is created, at least in part, by determining a monobit time delay to compensate for response errors attributable to analog input pins of the SerDes transceivers to contribute to formation of a desired beam.

5. The method of claim 1, wherein the SerDes transceivers are used in a loop back configuration to create a Sigma Delta receiver.

6. The method of claim 1, further comprising during a receiving mode, combining phase aligned multibit digital signals to achieve signal processing gain.

7. The method of claim 1, further comprising during a transmitting mode, combining power of multibit digital signals to achieve coherent gain.

8. The method of claim 1, further comprising utilizing analog input SerDes transceiver pins of the at least one digital signal processing chip and the monobit SerDes transceivers as virtual analog-to-digital or digital-to-analog converters.

9. The method of claim 1, wherein in the step of forming a digital beam, at least some of the plurality of digital signals come from a separate digital signal processing chip.

10. An ultra-wideband digital phased array radar system, comprising:

an antenna array comprising a plurality of antenna elements configured to receive a plurality of monobit analog signals; and at least one digital signal processing chip interfacing the antenna array, each digital signal processing chip being a field programmable gate array (FPGA) comprising an integrated all digital chip including a plurality of monobit SerDes transceivers and a digital beamforming unit, such that the digital signal processing chip is configured to:

determine, for each monobit analog signal, a respective digital signal conditioning value by using delta sigma modulation, DC offset modulation, and coherently summing a plurality of elements for dynamic range;

convert, through use of the plurality of monobit SerDes transceivers, the plurality of monobit analog signals into a plurality of digital signals, each of the digital signals being modified according to its respective digital signal conditioning value to phase align and synchronize the digital signals; and form a digital beam by coherently combining, within the digital beamforming unit, the plurality of digital signals.

11. The system of claim 10, wherein the at least one digital signal processing chip interfaces directly with the antenna elements.

* * * * *